(12) United States Patent
Hahne

(10) Patent No.: US 7,044,530 B1
(45) Date of Patent: May 16, 2006

(54) WINDSHIELD ASSEMBLY

(75) Inventor: Jesse Hahne, Anoka, MN (US)

(73) Assignee: Sportech, Inc., Elk River, MN (US)

( * ) Notice: Subject to any disclaimer, the term of this patent is extended or adjusted under 35 U.S.C. 154(b) by 0 days.

(21) Appl. No.: 11/194,223

(22) Filed: Aug. 1, 2005

(51) Int. Cl.
*B62J 17/04* (2006.01)
(52) U.S. Cl. .................................. 296/78.1; 296/96.21
(58) Field of Classification Search ............... 296/78.1, 296/84.1, 90, 92, 96.21
See application file for complete search history.

(56) References Cited

U.S. PATENT DOCUMENTS

| | | | |
|---|---|---|---|
| 4,269,445 A * | 5/1981 | Gager, Jr. .................. | 296/78.1 |
| 6,176,538 B1 * | 1/2001 | Lawson et al. ............ | 296/78.1 |
| 6,234,554 B1 * | 5/2001 | Willey ...................... | 296/78.1 |
| 6,736,441 B1 * | 5/2004 | Barber et al. .............. | 296/78.1 |
| 6,752,447 B1 | 6/2004 | Gagne | |
| 6,789,835 B1 * | 9/2004 | Wargin et al. ............. | 296/78.1 |

OTHER PUBLICATIONS

Author Unknown, JC Whitney, Inc.everything automotive, Universal Quich-Release Windshield, www.jcwhitney.com.
Author Unknown, EZ Research.com, shop for auto parts, Clear ATV windshields, Pro Quad Universal Quick-release windshields. www.ezresearch.com.
Author Unknown, Cabela's world's foremost outfitter, ATV Windshield with Mounting Bracket, www.cabelas.com.

* cited by examiner

*Primary Examiner*—Jason Morrow
(74) *Attorney, Agent, or Firm*—Sherrill Law Offices, PLLC; Elizabeth D. Lewen

(57) ABSTRACT

The invention is a windshield assembly comprising a windshield panel and a coupling assembly. The coupling assembly is for fixed attachment to the windshield panel and quick release attachment to a vehicle.

8 Claims, 6 Drawing Sheets

WINDSHIELD ASSEMBLY

FIELD OF INVENTION

This invention relates to windshield assemblies for open vehicles.

BACKGROUND

Open motorized vehicles such as all terrain vehicles (ATVs) are commonly used for recreational and utility purposes. Many ATVs are not equipped with windshield panels. The lack of a windshield panel allows wind and debris to blow in the face of the ATV operator, decreasing the visibility and comfort of the operator during use. After market windshield panels have been developed for use with most ATVs.

Often times the windshield panels become damaged during use or transportation in the bed of a truck or on a trailer. The industry has developed a windshield panel that is removably attached to the ATV to allow the windshield panel to be removed during transportation or replaced with a new windshield panel. The typical means of attaching a windshield panel to an ATV is disclosed in U.S. Pat. No. 6,752,447 ('447). The '477 coupling assembly attaches to the ATV handlebars by means of U-shaped brackets fixedly attached to the handlebars. By fixedly attaching the coupling assembly to the handlebars, considerable time is needed to remove the coupling assembly. Tools may also be needed to remove the coupling assembly. It would take considerable time and planning to remove the windshield and coupling assembly as disclosed in the '477 patent.

Therefore, what is needed is a hand operated windshield assembly that may be installed and removed quickly and easily.

SUMMARY OF THE INVENTION

A first embodiment of the invention is a windshield assembling comprising a windshield panel and a coupling assembly. The coupling assembly is for fixed attachment to the windshield panel and quick release attachment to a vehicle.

A second embodiment of the invention is a coupling assembly comprising a first mounting arm and a second mounting arm. The first mounting arm has at least a first end and a second end. The first end has a first quick release mechanism for releasable attachment to a vehicle. The second end is configured and arranged for fixed attachment to a windshield panel. The second mounting arm has at least a first end and a second end. The first end has a second quick release mechanism for releasable attachment to a vehicle. The second end is configured and arranged for fixed attachment to a windshield panel.

DETAILED DESCRIPTION OF A PREFERRED EMBODIMENT

Definitions

Figure 1:
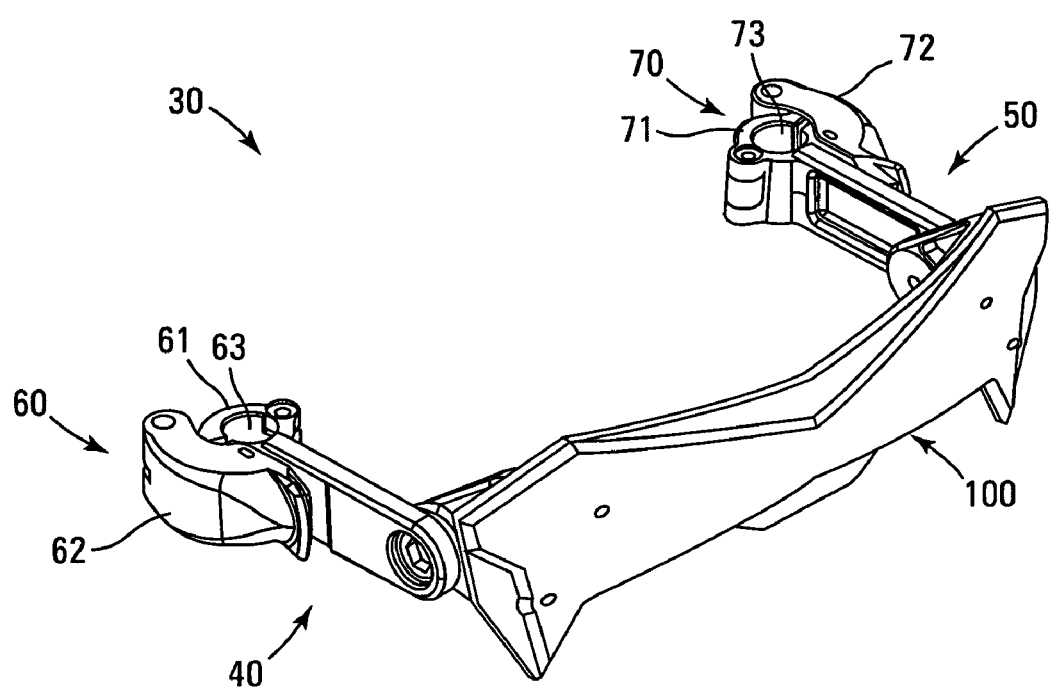
FIG. 1 is a top perspective view of one embodiment of the coupling assembly.

As utilized herein, including the claims, the term "vehicle" refers to an open vehicle having handlebars for steering.

As utilized herein, including the claims, the phrase "quick release mechanism" includes any and all quick release mechanisms known in the industry.

Nomenclature

| | |
|---|---|
| 10 | Windshield Assembly |
| 20 | Windshield Panel |
| 30 | Coupling Assembly |
| 31 | Fasteners |
| 40 | First Mounting Arm |
| 41 | First End of First Mounting Arm |
| 42 | Second End of First Mounting Arm |
| 50 | Second Mounting Arm |
| 60 | First Quick Release Mechanism |
| 61 | First Cam Bracket |
| 62 | First Lever |
| 63 | First Passageway |
| 70 | Second Quick Release Mechanism |
| 71 | Second Cam Bracket |
| 72 | Second Lever |
| 73 | Second Passageway |
| 80 | First Mounting Bracket |
| 81 | First End of First Mounting Bracket |
| 82 | Second End of First Mounting Bracket |
| 90 | Second Mounting Bracket |
| 91 | First End of Second Mounting Bracket |
| 92 | Second End of Second Mounting Bracket |
| 100 | Front Plate |
| 200 | Vehicle/ATV |
| 210 | Handlebar |
| L1 | First Longitudinal Axis |
| L2 | Second Longitudinal Axis |
| L3 | Third Longitudinal Axis |
| T1 | First Transverse Axis |
| T2 | Second Transverse Axis |

Construction

The coupling assembly 30 can be used to attach a windshield panel 20 to a vehicle 200. Vehicles 200 such as all terrain vehicles and snowmobiles either have no windshield panel or the windshield panels 20 are subject to replacement due to damage or customization. Windshield panels 20 are a popular after market accessory for all terrain vehicles. Therefore, the remainder of the discussion will be based upon an all terrain vehicle 200 ("ATV"). Limiting the remainder of the discussion to use of the invention on an ATV 200 is not intended to limit the invention. It should be recognized that the invention may be applied not only to ATVs 200 but also in other vehicles 200 such as motorcycles, snowmobiles, three-wheeled vehicles, etc.

As shown in FIG. 1, one embodiment of the coupling assembly 30 comprises a first mounting arm 40 and a second mounting arm. The first mounting arm 40 may have at least a first end 41 and a second end 42. The second mounting arm 50 may have at least a first end (not numbered) and a second end (not numbered).

The first end 41 of the first mounting arm 40 may be pivotably attached to a first quick release mechanism 60 for releasable attachment to an ATV 200. The first end (not numbered) of the second mounting arm 50 may be pivotably attached to a second quick release mechanism 70 for releasable attachment to an ATV 200. The first and second quick release mechanisms 60 and 70 enable the ATV 200 operator to install and remove the windshield panel 20 from the ATV 200, after initial installation, quickly and without tools.

Figure 2:
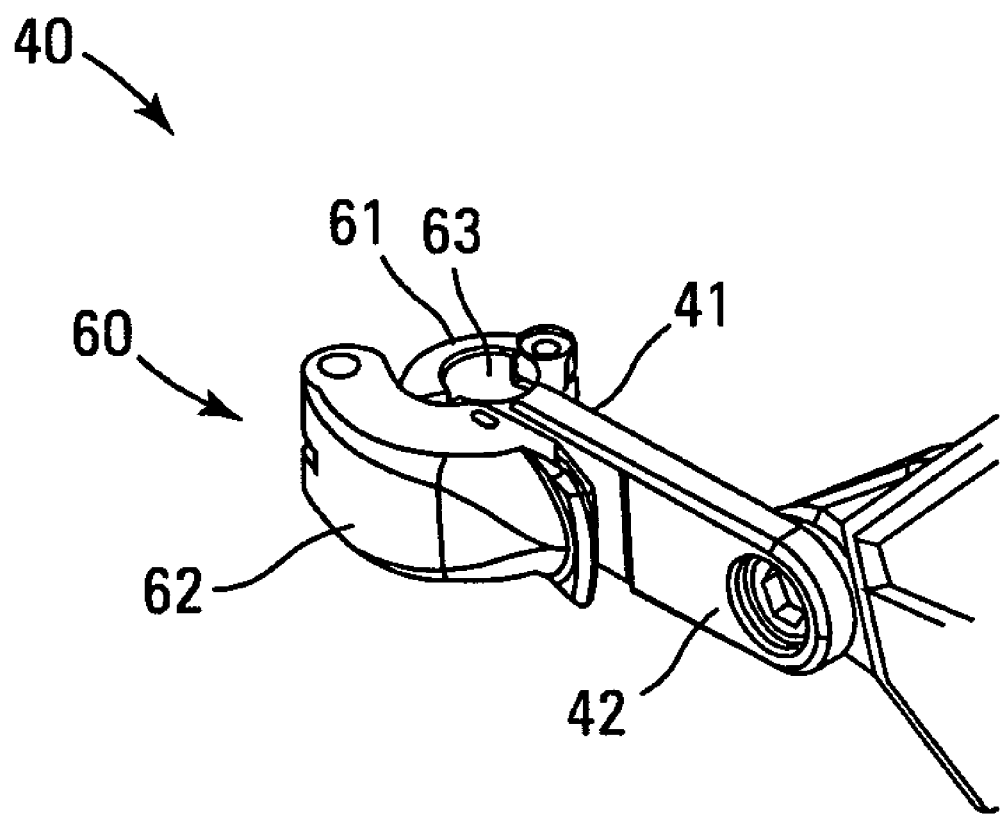
FIG. 2 is a side perspective view of the first quick release mechanisms in FIG. 1 in the closed and locked position.
Figure 3:
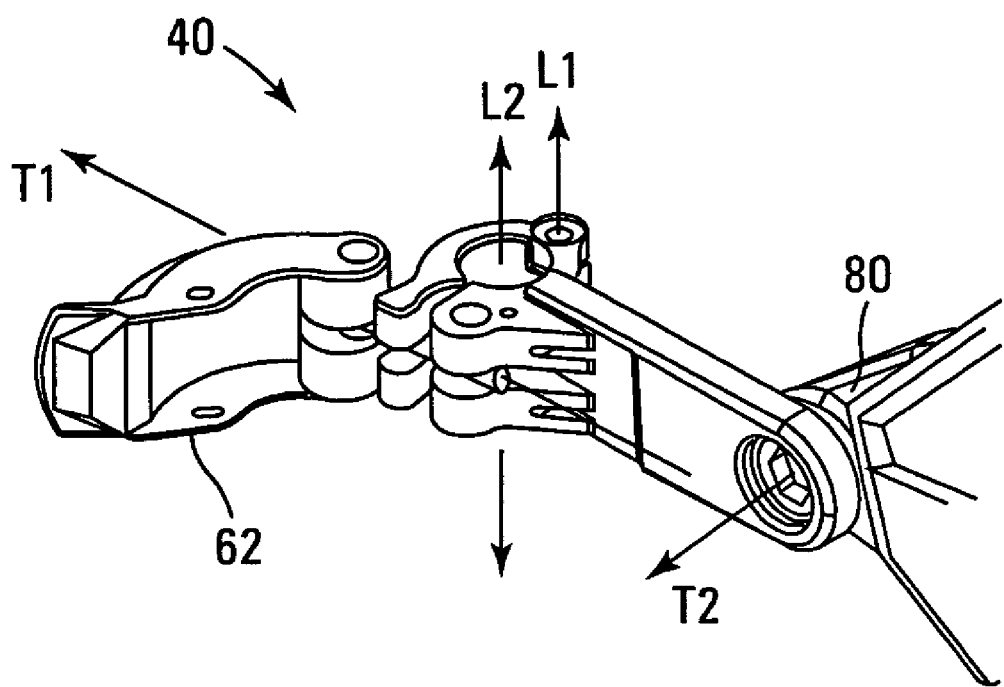
FIG. 3 is a side perspective view of the quick release mechanism in FIG. 2 in the open and unlocked position.

The first and second quick release mechanism 60 and 70 may comprise, respectively, at least a first cam bracket 61 and a second cam bracket 71 and a first lever 62 and a second lever 72. The first and second cam brackets 61 and 71 are configured and arranged, respectively, to define a longitudinally extending first passageway 63 and second passageway 73 when the first and second quick release mechanisms 60 and 70 are in a closed position. The first cam bracket 61 may be configured and arranged for rotatable attachment to the first end 41 of the first mounting arm 40. The second cam bracket 71 may be configured and arranged for rotatable attachment to the first end (not numbered) of the second mounting arm 50. The first cam bracket 61 may rotate about a first longitudinal axis L1 in relation to the first mounting arm 40 moving the first quick release mechanism 60 between a closed position and an open position. The second cam bracket 71 may rotate about a first longitudinal axis L1 in relation to the second mounting arm 50 moving the second quick release mechanism 70 between a closed position and an open position. The first lever 62 may then be configured and arranged for rotatable attachment to the first mounting arm 40 about a second longitudinal axis L2 in relation to the first mounting arm 40. The second lever 72 may then be configured and arranged for rotatable attachment to the second mounting arm 50 about a second longitudinal axis L2 in relation to the second mounting arm 50. The first and second levers 62 and 72 are longitudinally rotatable from an unlocked position to a locked position. The first lever 62 may be attached to the first mounting arm 40 so as to be repositionable along a first transverse axis T1 in relation to the second longitudinal axis L2. The second lever 72 may be attached to the second mounting arm 50 so as to be repositionable along a first transverse axis T1 in relation to the second longitudinal axis L2. The first and second levers 62 and 72 may be repositioned along the first transverse axis T1 to accommodate the first and second passageway 63 and 73 having a variable diameter (not numbered) and still allow the first and second levers 62 and 72 to achieve the locked position. As shown in FIGS. 2 and 3, the preferred first and second quick release mechanisms 60 and 70 are off-center clamps.

The second end 42 of the first mounting arm 40 and the second end (not numbered) of the second mounting arm 50 may be configured and arranged for fixed attachment to a windshield panel 20. The second end 42 of the first mounting arm 40 and the second end (not numbered) of the second mounting arm 50 may be configured and arranged for direct attachment to the windshield panel 20. Preferably first and second mounting brackets 80 and 90 are utilized as an interface between the first and second mounting arms 40 and 50 and the windshield panel 20.

The first end 81 of the first mounting bracket 80 may be configured and arranged for repositionable attachment to the second end 42 of the first mounting arm 40 about a second transverse axis T2 in relation to the first mounting arm 40. The first end 91 of the second mounting bracket 90 may be configured and arranged for repositionable attachment to the second end (not numbered) of the second mounting arm 50 about a second transverse axis T2 in relation to the second mounting arm 50. Repositionable attachment of the first and second mounting brackets 80 and 90 allows the windshield panel 20 to be repositioned along a third longitudinal axis L3 in relation to the ATV 200.

Figure 4:
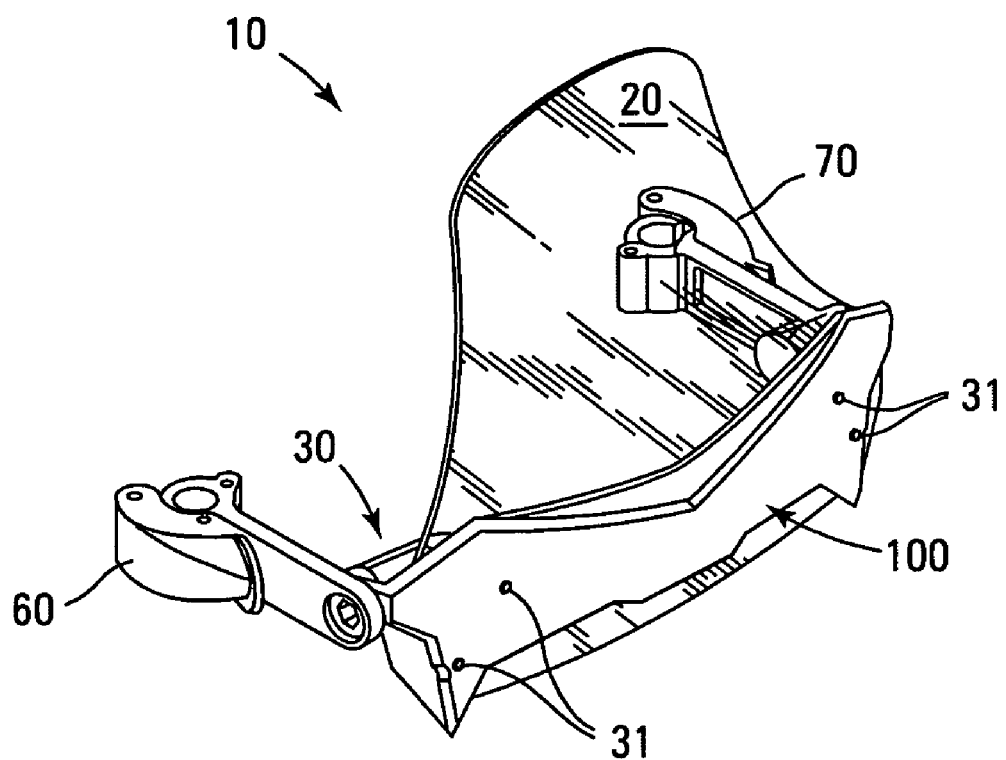
FIG. 4 is a front perspective view of one embodiment of a windshield assembly comprising the coupling assembly in FIG. 1 with a windshield panel attached.
Figure 5:
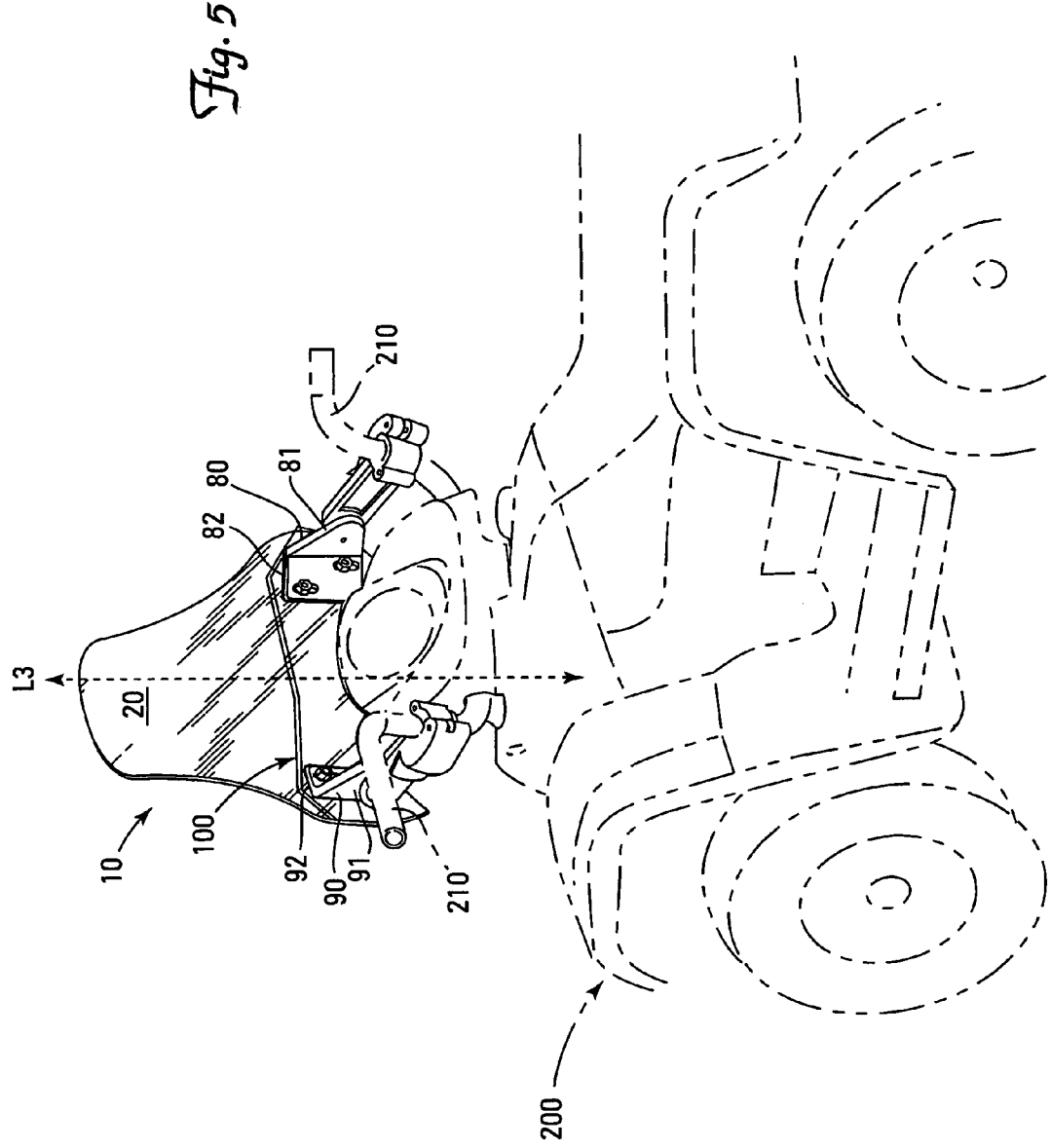
FIG. 5 is a back perspective view of the windshield assembly in FIG. 4 installed on a vehicle.

The second ends 82 and 92 of the first and second mounting bracket 80 and 90 may be configured and arranged for attachment to the windshield panel 20. As shown in FIGS. 4 and 5, a front plate 100 may also be used in conjunction with the first and second mounting brackets 80 and 90 to secure the windshield panel 20 to the coupling assembly 30.

The first mounting arm 40, second mounting arm 50, first quick release mechanism 60, second quick release mechanism 70, front plate 100, first mounting bracket 80, and second mounting bracket 90 may be made from any suitable material including metal, plastic, or wood. The preferred material is polycarbonate plastic.

The windshield panel 20 may be configured from any suitable material. Preferably the windshield panel 20 is configured from transparent and strong material such as polycarbonate plastic. The windshield panel 20 may also be configured entirely or partially from an opaque and strong material, as long as the vehicle 200 operator's vision is not impaired by the windshield panel 20.

Use

Use of the windshield assembly 10 is generally initiated by attaching the windshield panel 20 to the coupling assembly 30. The preferred coupling assembly 30 is shown in FIG. 1. The fasteners 31 securing the front plate 100 to the second ends 82 and 92 of the first and second mounting brackets 80 and 90 are removed. The windshield panel 20 may have fastening holes (not numbered) configured and arranged to align with the fastening holes (not numbered) in the front plate 100 and the first and second mounting brackets 80 and 90. After the fastening holes (not numbered) in the windshield panel 20 are properly aligned, the fasteners 31 are reinserted into the fastening holes (not numbered) in the front plate 100 and the first and second mounting brackets 80 and 90 and lightly tightened. FIG. 4 shows the coupling assembly 30 with a windshield panel 20 fixedly attached. The windshield panel 20 may be attached to the coupling assembly 30 after the coupling assembly 30 is attached to the ATV 200.

Figure 6:
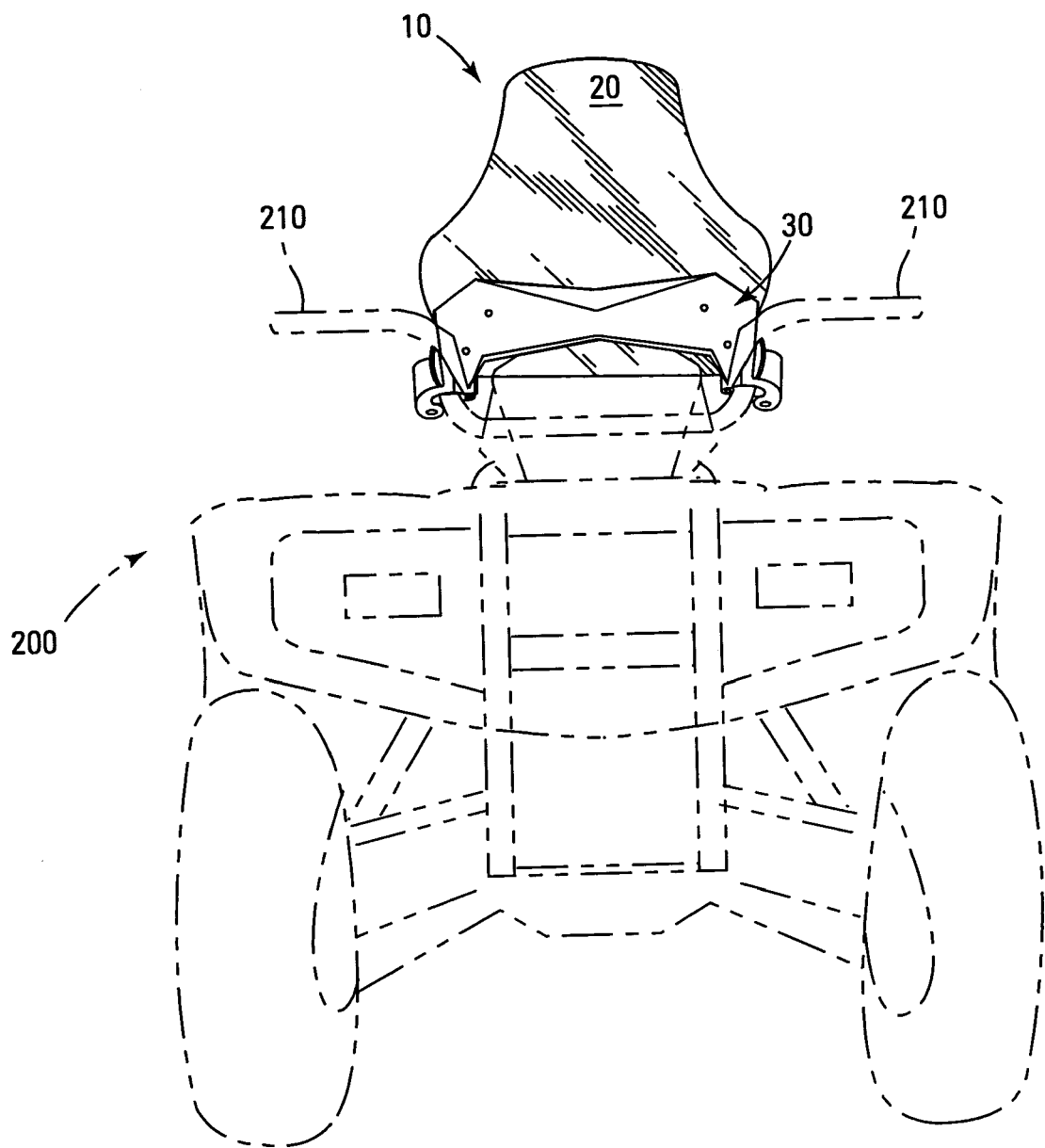
FIG. 6 is a front view of the windshield assembly in FIG. 5.

As shown in FIGS. 5 and 6, the coupling assembly 30 may then be attached to the ATV 200 handlebars 210. As shown in FIG. 3, the first and second quick release mechanisms 60 and 70 start in the open and unlocked position. The handlebars 210 of the ATV 200 are then inserted into the first and second passageways 63 and 73. The first and second cam brackets 61 and 71 are then rotated into the locked position. The first and second levers 62 and 72 are then rotated into the locked position. If the first and second levers 62 and 72 will not rotate into the closed position due to the diameter (not numbered) of the handlebars 210, the first and second levers 62 and 72 may be repositioned along the second transverse axis T2 until the first and second levers 62 and 72 will rotate into the locked position.

Once the coupling assembly 30 is attached to the handlebars 210, the windshield panel 20 may be repositioned along the third longitudinal axis L3 for optimal placement for the AVT 200 operator by loosening the fasteners 31 in the front plate 100 and adjusting the placement of the windshield panel 20. Once the windshield panel 20 is in the optimal position, the fasteners 31 are retightened.

The coupling assembly 30 may be quickly removed from the ATV 200 handlebars 210 by rotating the first and second levers 62 and 72 from the locked position and moving the first and second cam brackets 61 and 71 from the closed position. The windshield assembly 10 may then be attached and removed from the ATV 200 at any time in a matter of seconds.

I claim:

1. A windshield assembly, comprising:
   (a) a windshield panel; and
   (b) a coupling assembly for fixed attachment to the windshield panel and quick release attachment to a vehicle;
   (c) wherein (i) the coupling assembly has at least (1) a first mounting arm having at least (A) a first end having a first tool-less quick release mechanism for releasable attachment to a vehicle, and (B) a second end; and (2) a second mounting arm having at least (A) a first end having a second tool-less quick release mechanism for releasable attachment to a vehicle, and (B) a second end; and (3) wherein the second ends of the first and second arms are configured and arranged for fixed attachment to the windshield panel; and (ii) the first tool-less quick release mechanism and the second tool-less quick release mechanism are configured and arranged, when in a closed position, to circumscribe a portion of a vehicle.

2. The windshield assembly recited in claim 1, wherein the first tool-less quick release mechanism has at least a first lever configured and arranged to be repositionable along a first transverse axis in relation to a second longitudinal axis, and the second tool-less quick release mechanism has at least a second lever configured and arranged to be repositionable along a first transverse axis in relation to a second longitudinal axis.

3. The windshield assembly recited in claim 1, wherein the coupling assembly is for tool-less quick releasable attachment to a handlebar of the vehicle.

4. A coupling assembly, comprising:
   (a) a first mounting arm having at least,
      (i) a first end having a first tool-less quick release mechanism for releasable attachment to a vehicle, and
      (ii) a second end; and
   (b) a second mounting arm having at least,
      (i) a first end having a second tool-less quick release mechanism for releasable attachment to a vehicle, and
      (ii) a second end; and
   (c) wherein (i) the second ends of the first and second arms are configured and arranged for fixed attachment to a windshield panel and (ii) the first tool-less quick release mechanism and the second tool-less quick release mechanism are configured and arranged when in a closed position to circumscribe a portion of a vehicle.

5. The coupling assembly as recited in claim 4, wherein the first tool-less quick release mechanisms is an off-center clamp and the second tool-less quick release mechanism is an off-center clamp.

6. The coupling assembly as recited in claim 4, wherein the first and second tool-less quick release mechanisms are for releasable attachment to a handlebar of the vehicle.

7. The coupling assembly recited in claim 4, further comprising a windshield panel attached to the second ends of the first and second arms.

8. The coupling assembly recited in claim 4, wherein the first tool-less quick release mechanism has at least a first lever configured and arranged to be repositionable along a first transverse axis in relation to a second longitudinal axis, and the second tool-less quick release mechanism has at least a second lever configured and arranged to be repositionable along a first transverse axis in relation to a second longitudinal axis.

* * * * *